(12) United States Patent
Suemori et al.

(10) Patent No.: US 10,547,080 B2
(45) Date of Patent: Jan. 28, 2020

(54) CELL STACK, FUEL BATTERY MODULE INCLUDING THE SAME, AND METHOD OF MANUFACTURING CELL STACK

(71) Applicant: MITSUBISHI HEAVY INDUSTRIES, LTD., Tokyo (JP)

(72) Inventors: Shigenori Suemori, Tokyo (JP); Yasuhiko Tsuru, Tokyo (JP); Katsuaki Inoue, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 622 days.

(21) Appl. No.: 14/994,788

(22) Filed: Jan. 13, 2016

(65) Prior Publication Data
US 2016/0233537 A1 Aug. 11, 2016

(30) Foreign Application Priority Data
Feb. 6, 2015 (JP) .................................. 2015-022517

(51) Int. Cl.
*H01M 8/2465* (2016.01)
*H01M 8/04082* (2016.01)
(Continued)

(52) U.S. Cl.
CPC ......... *H01M 8/2465* (2013.01); *H01M 8/004* (2013.01); *H01M 8/0202* (2013.01);
(Continued)

(58) Field of Classification Search
CPC combination set(s) only.
See application file for complete search history.

(56) References Cited

U.S. PATENT DOCUMENTS

| 4,728,584 A * | 3/1988 | Isenberg | H01M 8/0625 |
| | | | 429/456 |
| 6,562,505 B1 * | 5/2003 | Tsukuda | H01M 8/0271 |
| | | | 427/115 |

(Continued)

FOREIGN PATENT DOCUMENTS

| JP | 05-094830 A | 4/1993 |
| JP | 06-096780 A | 4/1994 |

(Continued)

OTHER PUBLICATIONS

Kobayashi et al., "Extremely High-efficiency Thermal Power System-Solid Oxide Fuel Cell (SOFC) Triple Combined-cycle System", Mitsubishi Heavy Industries Technical Review, vol. 48, No. 3, pp. 9-21, Sep. 2011, w/English translation (13 pages).

(Continued)

*Primary Examiner* — Amanda J Barrow
(74) *Attorney, Agent, or Firm* — Westerman, Hattori, Daniels & Adrian, LLP

(57) ABSTRACT

A cell stack includes a plurality of battery cell units, in which an anode, an electrolyte, an inter connector, and a cathode are stacked on a surface of a substrate tube of a cylinder, and a plurality of battery cells is formed in an axis direction of the substrate tube, and a connection mechanism that connects an end portion of the substrate tube of the battery cell unit in the axis direction, and an end portion of the adjacent battery cell unit. The connection mechanism includes a connection jig including a cylindrical portion facing a cylindrical shape of the battery cell unit, and a protruding portion formed on a surface of the cylindrical portion and having a protruding shape in a radial direction, and an adhesive layer applied between the cylindrical portion of the connection jig and the cell unit, and joining the connection jig and the cell unit.

21 Claims, 9 Drawing Sheets

(51) Int. Cl.
  *H01M 8/2428* (2016.01)
  *H01M 8/00* (2016.01)
  *H01M 8/0202* (2016.01)
  *H01M 8/124* (2016.01)

(52) U.S. Cl.
  CPC ...... *H01M 8/2428* (2016.02); *H01M 8/04201* (2013.01); *H01M 2008/1293* (2013.01); *Y02P 70/56* (2015.11)

(56) References Cited

U.S. PATENT DOCUMENTS

| | | | | |
|---|---|---|---|---|
| 2007/0059576 | A1* | 3/2007 | Jacobson | H01M 4/8621 429/410 |
| 2008/0118813 | A1* | 5/2008 | Kawakami | H01M 8/0252 429/466 |
| 2011/0059383 | A1* | 3/2011 | Taniguchi | H01M 8/1226 429/465 |
| 2011/0065019 | A1* | 3/2011 | Taniguchi | H01M 8/12 429/488 |
| 2011/0195334 | A1* | 8/2011 | Crumm | H01M 8/0206 429/479 |
| 2011/0287339 | A1* | 11/2011 | Suh | C23C 18/1216 429/510 |
| 2012/0040267 | A1* | 2/2012 | Yoon | H01M 8/004 429/468 |
| 2012/0094217 | A1* | 4/2012 | Watanabe | H01M 8/0252 429/523 |
| 2016/0133980 | A1* | 5/2016 | Furuya | H01M 8/1286 427/115 |

FOREIGN PATENT DOCUMENTS

| | | | |
|---|---|---|---|
| JP | 9-153369 A | 6/1997 | |
| JP | 10-189016 A | 7/1998 | |
| JP | 10-189019 A | 7/1998 | |
| JP | 2005-524955 A | 8/2005 | |
| JP | 2008-071712 A | 3/2008 | |
| JP | 2011-60758 A | 3/2011 | |
| JP | 2013-143188 * | 7/2013 | ............. H01M 8/02 |
| JP | 2013-143188 A | 7/2013 | |
| JP | 2013-533585 A | 8/2013 | |
| JP | 2013-171789 A | 9/2013 | |
| JP | 2013-182700 A | 9/2013 | |
| JP | 2015-185301 A | 10/2015 | |

OTHER PUBLICATIONS

Decision of a Patent Grant dated Dec. 6, 2016, issued in counterpart Japanese Patent Application No. 2015-022517, with English translation. (5 pages).

* cited by examiner

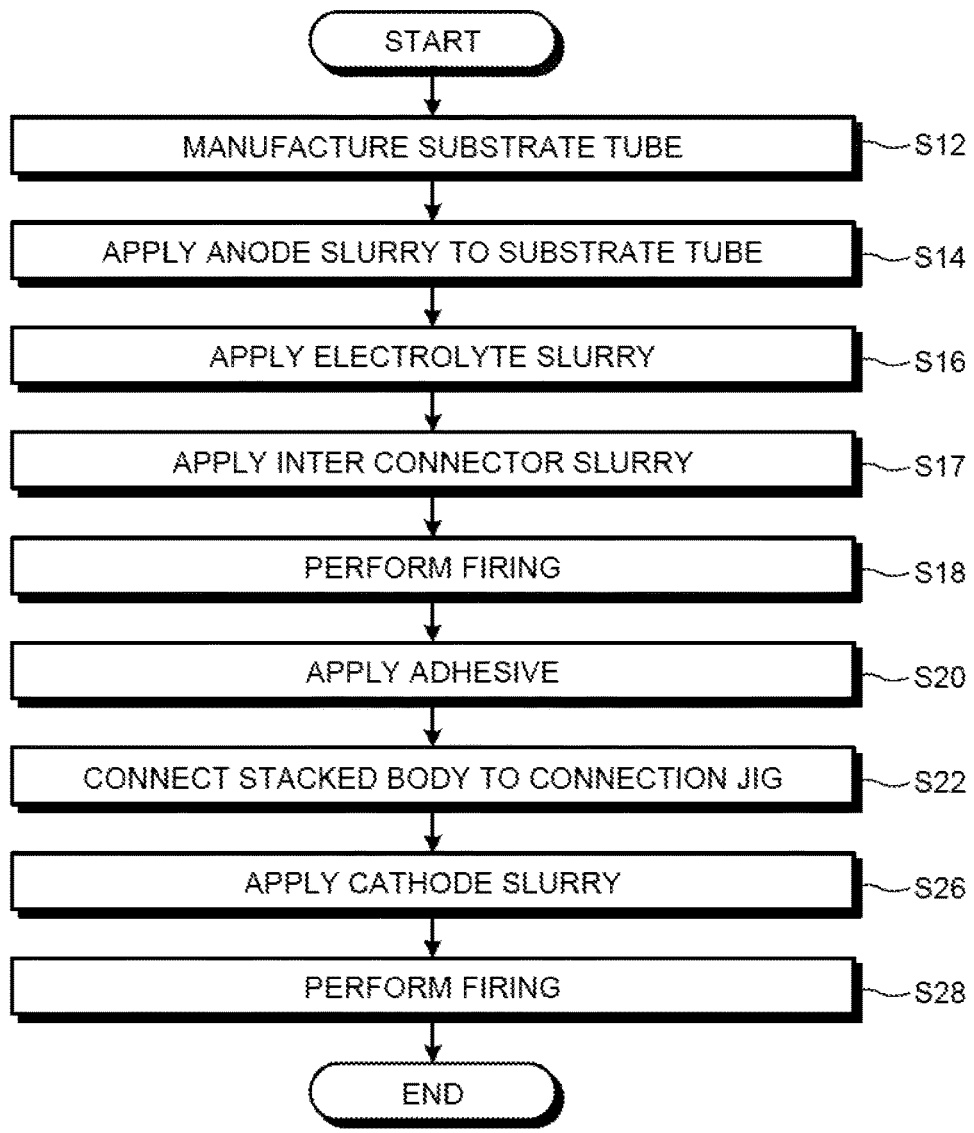
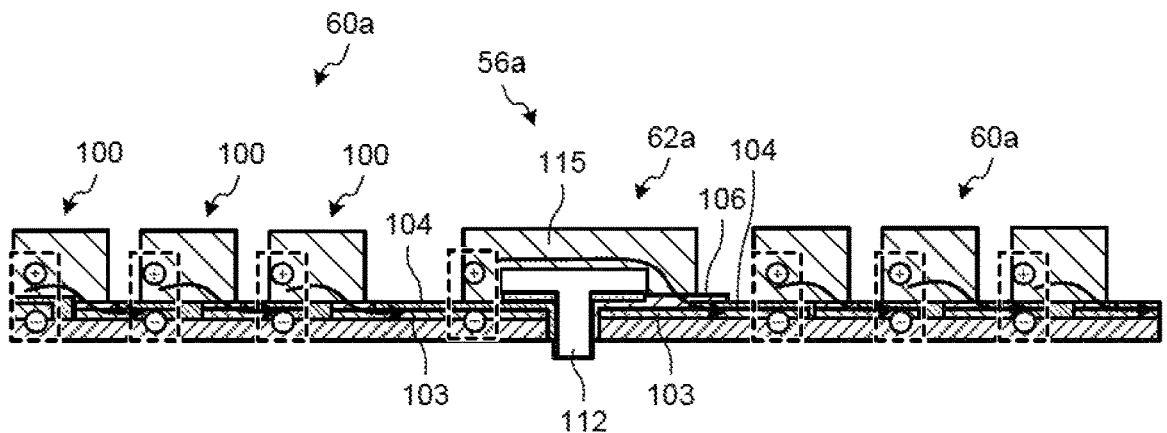

CELL STACK, FUEL BATTERY MODULE INCLUDING THE SAME, AND METHOD OF MANUFACTURING CELL STACK

FIELD

The present invention relates to a cell stack, a fuel battery module including the same, and a method of manufacturing a cell stack.

BACKGROUND

A fuel battery module mounted on a fuel battery system includes a plurality of cell stacks, the cell stack being an aggregate of fuel battery cells. The cell stack has a large number of fuel battery cells arranged and connected in series, thereby to make a voltage to be output high.

Here, Patent Literatures 1 and 2 propose structures in which a plurality of battery cell units provided with a fuel battery cell on a surface of a substrate tube is connected in series. Patent Literature 1 describes a structure provided with a cylindrical joining member having an outer diameter smaller than an inner diameter of the substrate tube and arranged inside the substrate tube, and an adhesive member having the same solid particles as the substrate tube between the joining member and the substrate tube, and connects two substrate tubes. Patent Literature 2 describes a structure that includes unit cells (battery cell units), and a support member that penetrates hollow portions of the unit cells to connect the unit cells in a longitudinal direction.

CITATION LIST

Patent Literature

Patent Literature 1: JP 2013-143188 A
Patent Literature 2: JP 9-153369 A

SUMMARY

Technical Problem

The device described in Patent Literature 1 connects the two battery cell units with the joining member and the adhesive. The device described in Patent Literature 2 forms a screw groove in the support member, and screws the support member into the groove of an inner wall of the hollow, thereby to connect the two battery cell units.

In the structure described in Patent Literature 1, the joining member may deviate from the two battery cell units. If the position of the joining member deviates, a gap is caused between the joining member and the battery cell units, and the gap may become a cause of failure. Further, in the structure described in Patent Literature 2, the connection portion may become a cause of failure.

Therefore, an objective of the present invention is to provide a cell stack having a structure in which a plurality of battery cell units is connected in series and having less failure, a fuel battery module including the same, and a method of manufacturing a cell stack.

Solution to Problem

According to an aspect of the present invention, a cell stack includes: a plurality of battery cell units, in which an anode, an electrolyte, an inter connector, and a cathode are stacked on a surface of a cylindrical substrate tube, and a plurality of battery cells is formed in an axis direction of the substrate tube; and a connection mechanism that connects an end portion of the substrate tube of the battery cell unit in the axis direction, and an end portion of the adjacent battery cell unit. The connection mechanism includes a connection jig including a cylindrical portion facing a cylindrical shape of the battery cell unit, and a protruding portion formed on a surface of the cylindrical portion and having a protruding shape in a radial direction, and an adhesive layer applied between the cylindrical portion of the connection jig and the battery cell unit to join the connection jig and the battery cell unit.

Advantageously, in the cell stack, in the connection jig, a relationship between a distance d from an end portion of the cylindrical portion to the protruding portion, and a thickness w of the substrate tube is $3 \leq d/w \leq 9$ in the axis direction.

Advantageously, the cell stack further includes a connection portion cathode that coats an entire surface of an end portion of the connection jig at an outside in the radial direction, and electrically connects two battery cell units arranged across the connection jig.

Advantageously, in the cell stack, the connection portion cathode is in contact with the electrolyte of one battery cell unit, and is in contact with the inter connector of the other battery cell unit.

Advantageously, in the cell stack, in the battery cell unit, a layer of a same material as the inter-connector is formed on an end surface of the substrate tube in the axis direction.

Advantageously, in the cell stack, in the connection jig, the cylindrical portion is arranged at an outer side than the substrate tube of the battery cell unit.

Advantageously, in the cell stack, in the connection jig, the cylindrical portion is arranged at an inner side than the substrate tube of the battery cell unit.

Advantageously, in the cell stack, in the battery cell unit, a layer of a same material as the inter connector is formed between the substrate tube and the cylindrical portion.

According to another aspect of the present invention, a fuel battery module includes: a cell aggregate in which a plurality of cell stacks according to any one of the above is arranged in parallel; a vessel that houses the cell aggregate; a fuel supply main device configured, to supply a fuel gas to an inside of the battery cell units of the cell stacks; and an oxidant supply main device configured to supply an oxidant to an outside of the cell stacks.

According to still another aspect of the present invention, a method of manufacturing a cell stack includes: manufacturing a plurality of stacked bodies, the stacked body having an anode, an electrolyte, and an inter-connector stacked on a surface of a cylindrical substrate tube; applying an adhesive to an end portion of the stacked body; inserting the end portion of the stacked body, the end portion having been applied with the adhesive, into a cylindrical portion of a connection jig including the cylindrical portion and a protruding portion formed on a surface of the cylindrical portion and having a protruding shape in a radial direction, and causing the end portion to be in contact with the protruding portion; and applying cathode layer slurry to the stacked body and an outer periphery of the connection jig, and performing firing.

Advantageous Effects of Invention

According to the present invention, two battery cell units are connected with a connection jig including a cylindrical portion and a protruding portion formed on a surface of the cylindrical portion and having a protruding shape in a radial direction, so that the cylindrical portion and the cylindrical portion of the battery cell unit are caused to face each other, and the protruding portion and an end portion of the battery cell unit are brought into contact with each other. Accordingly, contact of the battery cell unit and the protruding portion can maintain the position of the battery cell unit with respect to the connection jig. Further, the cylindrical portion can support the end portion of the battery cell unit, a load applied on the cell stack can be received by the connection jig, and concentration of the load to the battery cell unit can be suppressed.

BRIEF DESCRIPTION OF DRAWINGS

FIG. 8 is a flowchart illustrating an example of a method of manufacturing a cell stack.

FIG. 9 is a sectional view schematically illustrating a part of a cell stack of another example.

DESCRIPTION OF EMBODIMENTS

Hereinafter, the present invention will be described with reference to the appended drawings. Note that the present invention is not limited to embodiments below. Further, configuration elements in the embodiments include elements that are easy and replaceable by a person skilled in the art, and substantially the same elements.

Figure 1:
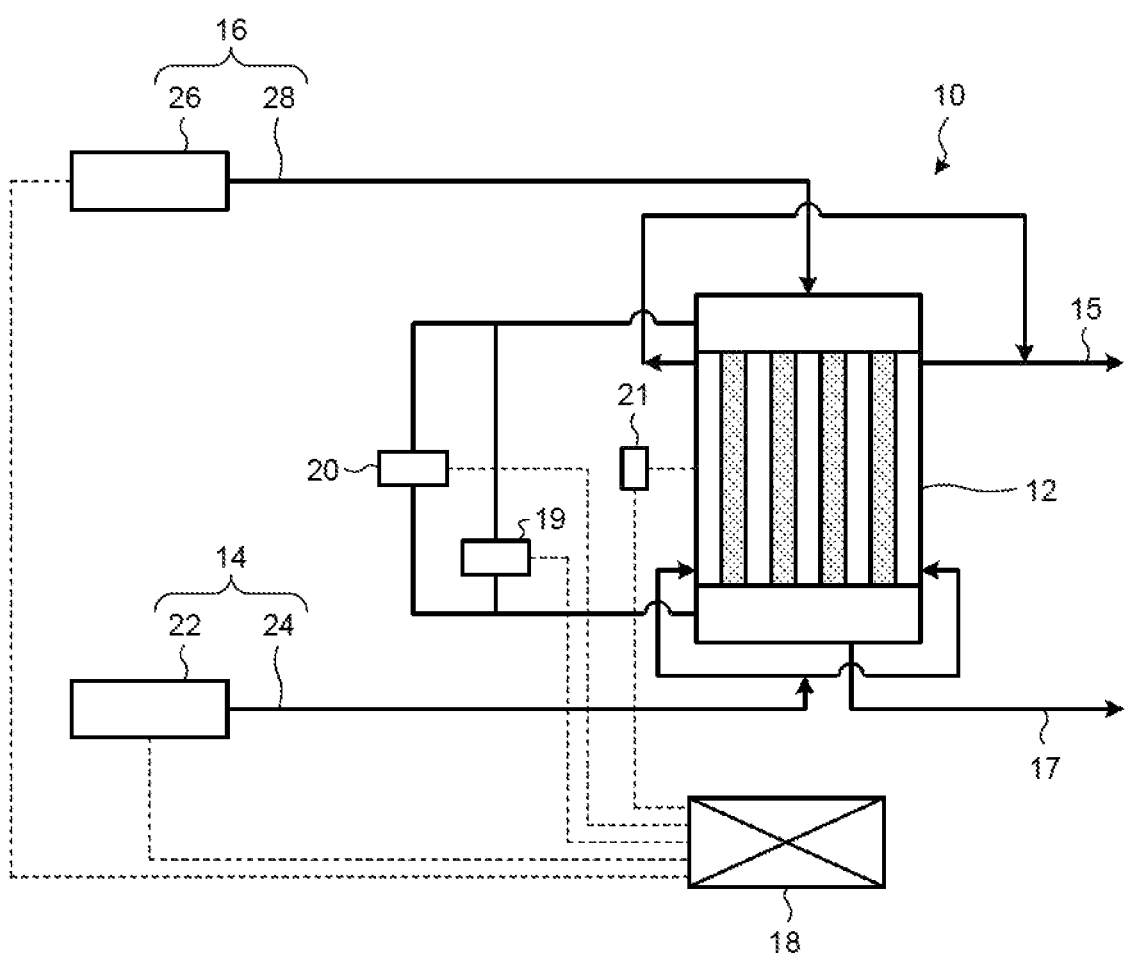
FIG. 1 is an outline configuration diagram schematically illustrating a fuel battery system of the present embodiment.

FIG. 1 is an outline configuration diagram schematically illustrating a fuel battery system of the present embodiment. A fuel battery system 10 of the present embodiment includes a solid oxide-type fuel battery module, a so-called solid oxide fuel cell (SOFC), and performs an operation while controlling the fuel battery module. The fuel battery system may supply a fuel gas that has passed through the fuel battery module and a part of air (oxidant gas) to a combustor of a gas turbine. That is, the fuel battery system 10 may be a part of a combined system connected with another power generation device.

As illustrated in FIG. 1, the fuel battery system 10 includes a fuel battery module 12, an air supply device (oxidant supply device) 14 that supplies air (oxidant gas), an air discharge pipe 15 through which air (flue air and flue oxidant gas) that has passed through the fuel battery module 12 is discharged, a fuel supply device 16 that supplies a fuel gas, a fuel discharge pipe 17 through which the fuel gas (flue fuel gas) that has passed through the fuel battery module 12 is discharged, a control device 18 that controls operations of respective units, a voltmeter 19, an ammeter 20, and a thermometer 21. Note that, in the present embodiment, a case in which the air is used as the oxidant gas has been described. However, any oxidant can be used as long as the oxidant oxidizes the fuel gas.

The fuel battery module 12 causes the supplied air and fuel gas to react with each other to generate power. The fuel battery module will be described below.

The air supply device 14 supplies the air to the fuel battery module 12. The air supply device 14 includes an air supply source 22 and air supply piping 24. The air supply source 22 is a device that sends the air, such as a scavenging fan or a pump. The air supply piping 24 connects the air supply source 22 and the fuel battery module 12. The air supply piping 24 supplies the air sent from the air supply source 22 to the fuel battery module 12.

The fuel supply device 16 supplies the fuel gas toward a fuel supply chamber 84 described below. The fuel supply device 16 includes a fuel supply source 26 and fuel supply piping 28. The fuel supply source 26 includes a tank in which the fuel gas is stored, a control valve that controls a flow rate of the fuel gas supplied from the tank, and the like. The fuel supply piping 28 connects the fuel supply source 26 and the fuel battery module 12. The fuel supply piping 28 supplies the air sent from the fuel supply source 26 to the fuel battery module 12.

Further, the fuel battery system 10 includes the voltmeter 19 that measures a voltage value of the fuel battery module 12, the ammeter 20 that measures a current value of the fuel battery module 12, and the thermometer 21 provided to the fuel battery module 12. The ammeter 20 measures the current obtained by the power generation of the fuel battery module 12. The thermometer 21 measures the temperature of a power generation chamber 82 described below of the fuel battery module 12.

The control device 18 performs control at the time of start/stop operations of the fuel battery module 12, and performs control at the time of a power generation operation of the fuel battery module 12. The control device 18 controls an amount of the air supplied front the air supply device 14, an amount of the fuel gas supplied from the fuel supply device 16, and the power taken out of the fuel battery module 12, based on measurement results of the ammeter 20, the thermometer 21, and the voltmeter, and an input instruction.

Figure 2:
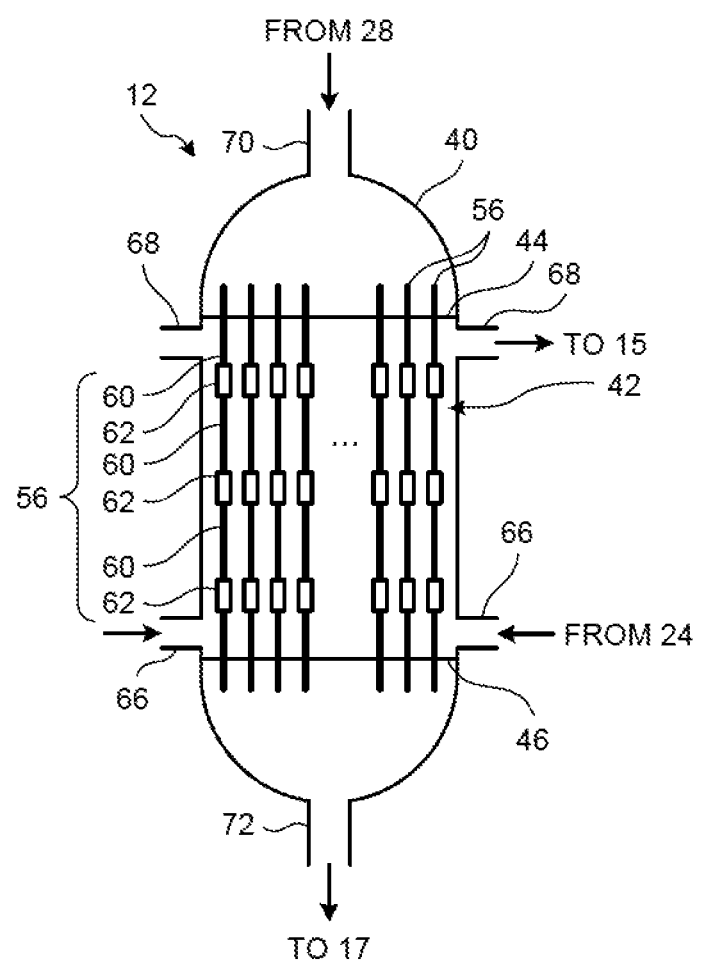
FIG. 2 is an outline configuration diagram schematically illustrating a fuel battery module.
Figure 3:
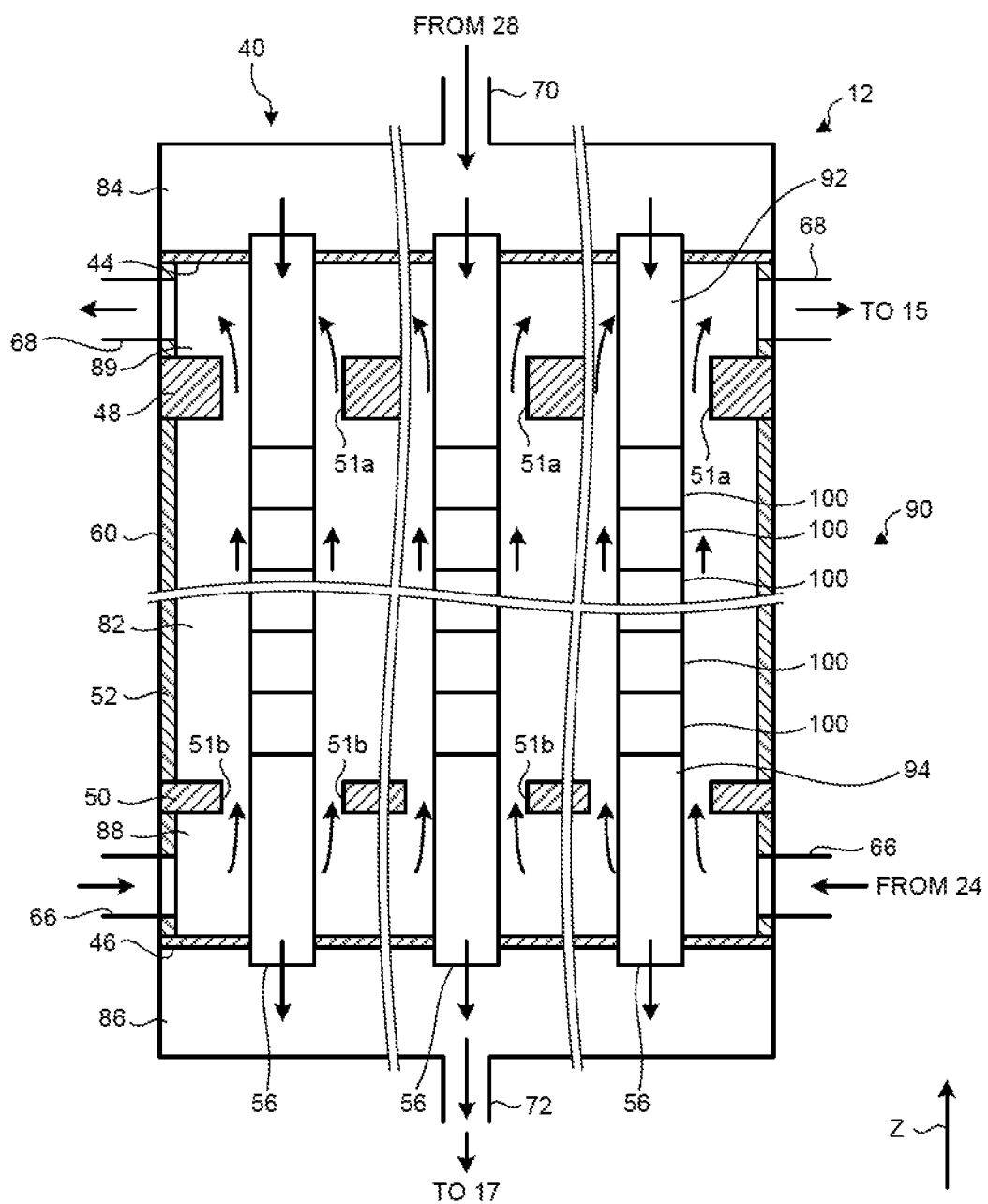
FIG. 3 is an outline configuration diagram schematically illustrating the fuel battery module.

Next, the fuel battery module 12 will be described using FIGS. 2 and 3. FIG. 2 is an outline configuration diagram schematically illustrating the fuel battery module. FIG. 3 is an outline configuration diagram schematically illustrating the fuel battery module.

As illustrated in FIGS. 2 and 3, the fuel battery module 12 includes a vessel 40, a cell aggregate 42, a pipe support plate (upper-side pipe support plate) 44, a pipe support plate (lower-side pipe support plate) 46, a heat insulating body (upper-side heat insulating body) 48, a heat insulating body (lower-side heat insulating body) 50, and a circumferential-direction heat insulating body 52.

The vessel 40 includes a cylindrical portion, and an upper hemisphere and a lower hemisphere provided in both ends of the cylindrical portion, as illustrated in FIG. 2. Here, the vessel 40 is installed in a direction in which a Z axis direction (first direction) that is a direction parallel to a vertical direction becomes the longitudinal direction. That is, the upper hemisphere is arranged in an upper side of the lower hemisphere in the vertical direction, and a central axis of the cylindrical portion becomes a direction parallel to the Z axis direction. The fuel battery module 12 is favorably, but not limited to be, arranged in the direction in which the central axis of the cylindrical portion becomes a direction parallel to the Z axis direction, like the present embodiment.

In the vessel 40, two air inflow pipes 66, two air discharge pipes 68, a fuel gas inflow pipe 70, and a fuel gas discharge pipe 72 are formed. The two air inflow pipes 66 are formed in a vicinity side of the lower hemisphere of the cylindrical portion. The air inflow pipes 66 are connected with the air supply piping 24, and allow the air supplied through the air supply piping 24 to flow in to the vessel 40. The two air discharge pipes 68 are connected to a vicinity side of the upper hemisphere of the cylindrical portion. The air discharge pipes 68 are connected with the air discharge pipe 15, and allow the air in the vessel 40 to be discharged to the air discharge pipe 15. The fuel gas inflow pipe 70 is formed in the upper hemisphere. The fuel gas inflow pipe 70 is connected with the fuel supply piping 28, and allows the fuel gas supplied through the fuel supply piping 28 to flow in to the vessel 40. The fuel gas discharge pipe 72 is formed in the lower hemisphere. The fuel gas discharge pipe 72 is connected with the fuel discharge pipe 17, and allows the fuel gas in the vessel 40 to be discharged to the fuel discharge pipe 17.

Here, the vessel 40 is a sealed vessel except portions at which the two air inflow pipes 66, the two air discharge pipes 68, the fuel gas inflow pipe 70, and the fuel gas discharge pipe 72 are provided. In the vessel 40, the cell aggregate 42, the pipe support plate (upper-side pipe support plate) 44, the pipe support plate (lower-side pipe support plate) 46, the heat insulating body (upper-side heat insulating body) 48, the heat insulating body (lower-side heat insulating body) 50, and the circumferential-direction heat insulating body 52 are housed.

The cell aggregate 42 has a large number of cell stacks 56 arranged in parallel. The plurality of cell stacks 56 has a cylindrical-shaped space in its inside, and is arranged in the direction in which the central axis becomes the Z axis direction, that is, the direction in which the central axis becomes parallel to the central axis of the cylindrical portion. The cell stack 56 has a plurality of fuel battery cells 100 arranged in series in the Z axis direction, as illustrated in FIGS. 2 and 3. The cell stack 56 includes battery cell units 60 in which the plurality of fuel battery cells 100 is formed, and a connection mechanism 62 that connects the battery cell units 60. A structure of the cell stack 56 will be described below.

The pipe support plate 44 and the pipe support plate 46 support both ends of the cell stack 56. The pipe support plate 44 is a plate-like member arranged in one side (upper side) of the vessel 40 in the axis direction.

The pipe support plate 46 is a plate-like member arranged in the other side (lower side) of the vessel 40 in the axis direction. The other end portion of the cell stack 56 arranged in the vessel 40 is inserted in the pipe support plate 46. One end portion of the cell stack 56 arranged in the vessel 40 is inserted in the pipe support plate 44. All of the cell stacks 56 arranged in the vessel 40 are inserted in the pipe support plates 44 and 46. Connection portions between the pipe support plates 44 and 46 and the cell stacks 56 are sealed. Further, outer edges of the pipe support plates 44 and 46 are in contact with the vessel 40 or the circumferential-direction heat-insulating body 52, and contact portions are sealed. Accordingly, the pipe support plate 44 divides an inner-space of the vessel 40.

A space (divided space) surrounded by the upper hemisphere and the pipe support plate 44 of the vessel 40 is connected with the fuel gas inflow pipe 70, and serves as the fuel supply chamber 84 to which the fuel gas is supplied through the fuel gas inflow pipe 70. Further, a space divided by the lower hemisphere and the pipe support plate 46 of the vessel 40 is connected with the fuel gas discharge pipe 72, and serves as a fuel discharge chamber 86 that discharges the fuel gas through the fuel gas discharge pipe 72. Further, the fuel supply chamber 84 is connected with one opening end of the cell stack 56 inserted in the pipe support plate 44. The fuel discharge chamber 86 is connected with the other opening end of the cell stack 56 inserted in the pipe support plate 44. Accordingly, the fuel gas supplied to the fuel supply chamber 84 passes through an inside of the cell stack 56 and is discharged to the fuel discharge chamber 86.

A heat insulating body 48 and a heat insulating body 50 are arranged between the pipe support plate 44 and the pipe support plate 46. The heat insulating body 48 is arranged in one side (upper side) of the vessel 40 in the axis direction, and is formed into a blanket shape or a board shape, using a heat insulating material. The heat insulating body 50 is arranged in the other side (lower-side) of the vessel 40 in the axis direction, and is formed into a blanket shape or a board shape, using a heat-insulating material. Holes 51a and 51b into which the cell stacks 56 are inserted are respectively formed in the heat insulating bodies 48 and 50. Diameters of the holes 51a and 51b are larger than that of the cell stacks 56.

A space sandwiched by the heat insulating body 48 and the heat insulating body 50 serves as the power generation chamber 82. Further, a space between the pipe support plate 46 and the lower-side heat insulating body 50 is connected with an air inflow pipe 66, and serves as an air supply chamber 88. A space between the pipe support plate 44 and the upper-side heat insulating body 48 is connected with an air discharge pipe 68, and serves as an air discharge chamber 89.

The circumferential-direction heat insulating body 52 is affixed to an inner periphery of the cylindrical portion of the vessel 40. The circumferential-direction heat insulating body 52 suppresses transfer of the heat between an inside and an outside of the vessel 40. Here, the cell stack 56 of the fuel battery module 12 has the fuel battery cells 100 arranged only inside the power generation chamber 82. In the cell stack 56, an area in which the fuel battery cells 100 are arranged is a power generation portion 90, a portion where no fuel battery cell 100 is arranged at an upper side than the power generation portion 90 in the Z direction is a lead portion 92, a portion where no fuel battery cell 100 is arranged at a lower side than the power generation portion 90 in the Z axis direction is a lead portion 94. The lead portion 92 includes a portion that is in contact with the pipe support plate 44 and a portion facing the heat insulating body 48. The lead portion 94 includes a portion that is in contact with the pipe support plate 46 and a portion facing the heat insulating body 50.

Figure 4:
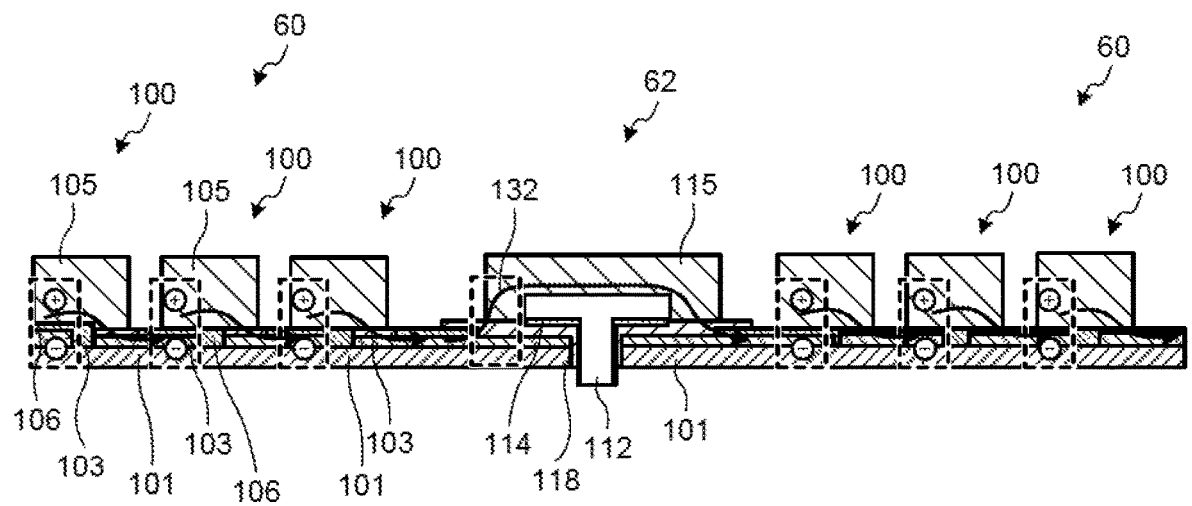
FIG. 4 is a sectional view schematically illustrating a part of a cell stack.
Figure 5:
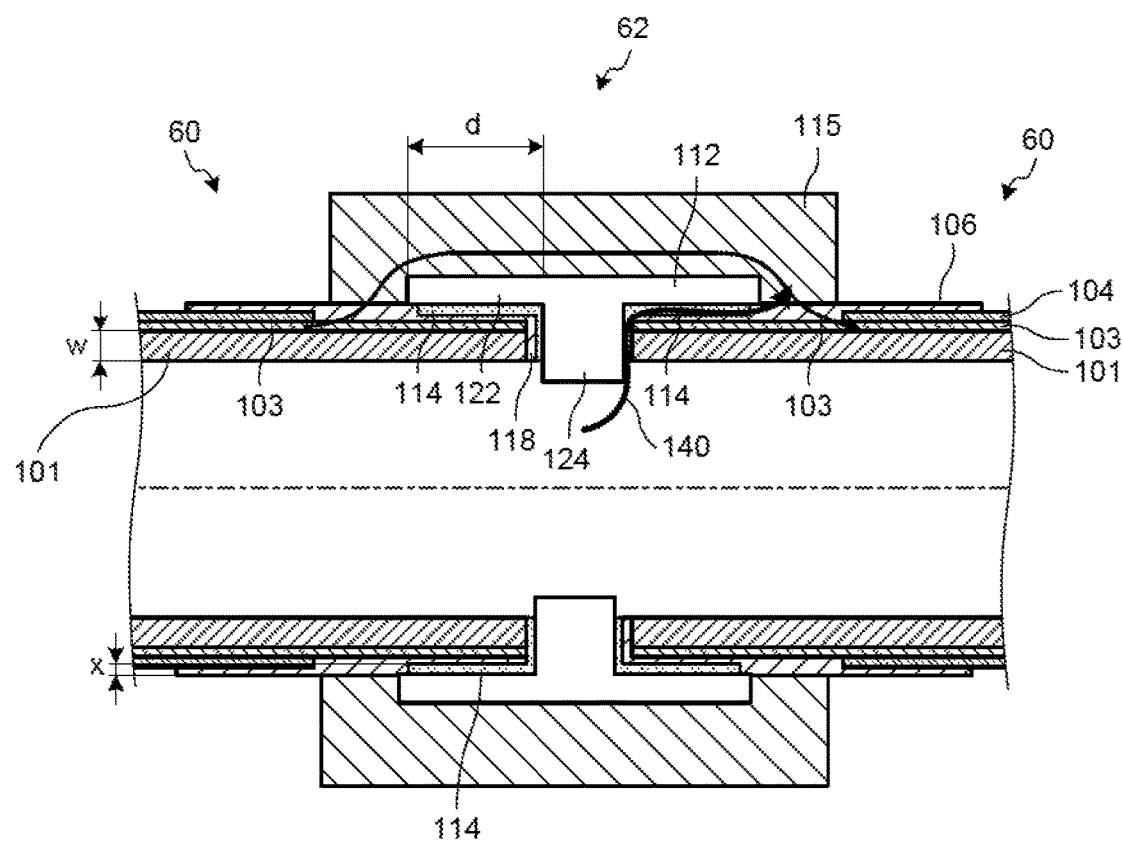
FIG. 5 is an enlarged sectional view illustrating an enlarged vicinity of a connection mechanism.
Figure 6:
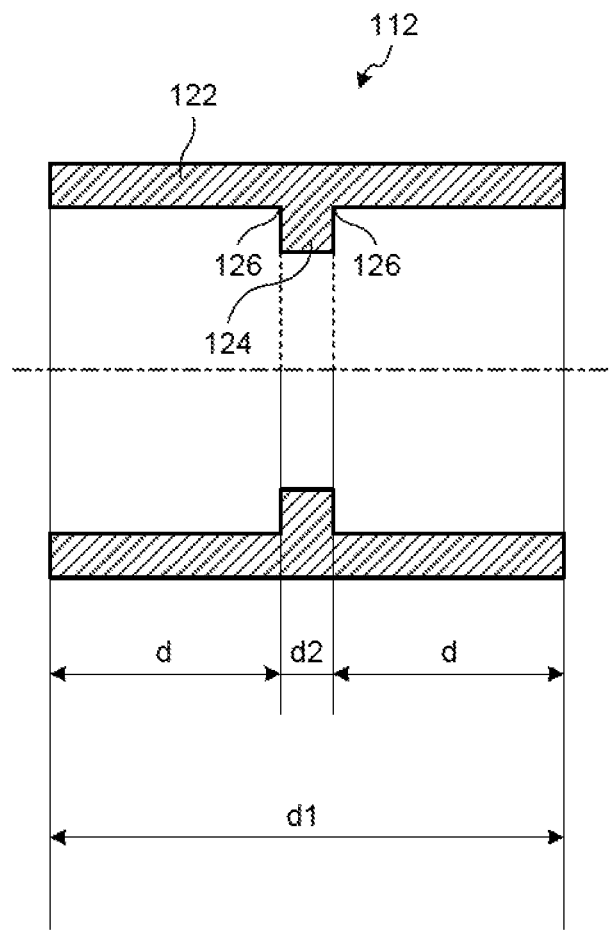
FIG. 6 is a sectional view illustrating a connection jig.
Figure 7:
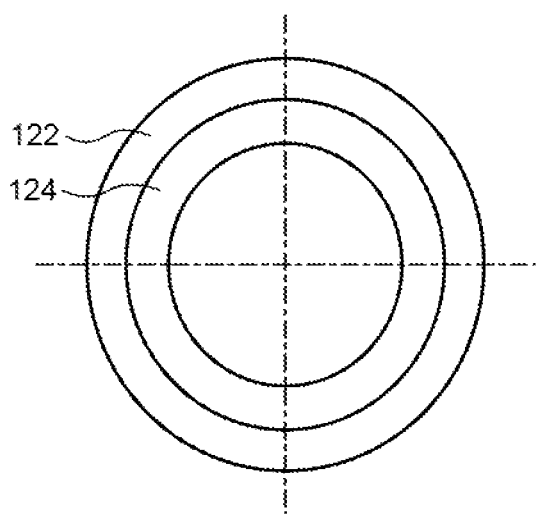
FIG. 7 is a top view of the connection jig.

Next, the cell stack 56 of the present embodiment will be described using FIGS. 4 to 7, in addition to FIGS. 2 and 3. FIG. 4 is a sectional view schematically illustrating a part of the cell stack. FIG. 5 is an enlarged sectional view illustrating an enlarged vicinity of the connection mechanism. FIG. 6 is a sectional view of a connection jig. FIG. 7 is a top view of the connection jig.

The cell stack 56 includes a plurality of the battery cell units 60 and the connection mechanism 62. The battery cell unit 60 is a tube extending in the Z axis direction, similarly to a substrate tube 101, and having the fuel battery cells 100, which serves as power generation elements, provided in an outer peripheral surface. The battery cell unit 60 has a plurality of the fuel battery cells 100 arranged in the Z axis direction. The plurality of battery cell units 60 is arranged in series in the Z axis direction. The connection mechanism 62 connects the battery cell units 60 arranged side by side in the Z axis direction.

The battery cell unit 60 includes, as illustrated in FIG. 4, the substrate tube 101 having a cylindrical shape, and the fuel battery cells 100 provided on an outer peripheral surface of the substrate tube 101 and serving as the power generation elements. The substrate tube 101 is a cylindrical porous tube made of a ceramic, and the fuel gas flows inside the tube. Since the substrate tube 101 is a porous tube, the substrate tube 101 guides the fuel gas flowing inside the tube to the outer peripheral surface side of the tube. The fuel battery cell 100 is configured such that an anode (fuel electrode) 103, a solid electrolyte 104, and a cathode (air electrode) 105 are stacked, and the anode 103 and the cathode 105 are provided at both sides of the solid electrolyte 104. The cathode 105 contains active metal, and has a function to contribute to a combustion reaction with the contained active metal (combustion by a catalytic reaction). Further, the fuel battery cell 100 has the anode 103 to be in contact with the outer peripheral surface of the substrate tube 101, and the plurality of fuel battery cells 100 is arranged in the axis direction of the substrate tube 101. In the plurality of fuel battery cells 100, the anode 103 of one adjacent fuel battery cell 100 and the cathode 105 of the other adjacent fuel battery cell 100 are connected with an inter connector 106. The fuel battery cell 100 configured as described above performs power generation at a high temperature of from 800 to 950° C., at the time of a power generation operation of the fuel battery system 10. The battery cell unit 60 has the anode 103, the solid electrolyte 104, and the inter connector 106, the cathode 105 stacked on the substrate tube 101 in the aforementioned order. Further, the battery cell unit 60 has the anode 103 and the inter connector 106 formed of a dense material, and suppresses leakage of the fuel gas inside the substrate tube 101 to the side where the air exists, which is outside the substrate tube 101.

The battery cell unit 60 favorably has an outer diameter of the substrate tube 101 be a diameter of 10 mm to 37 mm. Further, the cell stack 56 favorably has the length of the substrate tube 101 of one battery cell unit 60 be the same as the length of the substrate tube 101 of the other battery cell unit 60 in terms of mass production, when joining two battery cell units 60. For example, when a cell stack having the total length of 2 m is manufactured, the length of one substrate tube 101 is favorably made to be 1.0 m, and the length of the other substrate tube 101 is favorably made to be 1.0 m.

Further, the battery cell unit 60 of the present embodiment has a protection film 118 formed in an end portion where the connection mechanism 62 is installed. The protection film 118 is formed on an end portion in the axial direction of a surface (outer peripheral surface) of the substrate tube 101 at an outside in a radial direction, an end surface of the substrate tube 101, and an end surface of the adjacent battery cell unit 60 side. The protection film 118 of the present embodiment is formed of the same material as the inter connector (a dense film having an electrical conduction property). A portion of the protection film 118, the portion being of the surface of the substrate tube 101, is integrally formed with the inter connector (the dense film having an electrical conduction property) 106. A portion of the end surface of the protection film 118 is formed by application of the material used for the inter connector.

Next, the connection mechanism 62 includes, as illustrated in FIGS. 4 and 5, a connection jig 112, an adhesive layer 114, and a connection portion cathode 115. The connection jig 112 is arranged between two connected battery cell units 60, and is glued with the two battery cell units 60 with the adhesive layer 114. The connection jig 112 is formed of a dense material having thermal expansion similar to the solid electrolyte 104, for example, zirconia-based ceramics such as zirconia ($ZrO_2$), yttria stabilized zirconia (YSZ), or the like. The connection jig 112 is favorably formed of a material having a similar thermal expansion coefficient to the substrate tube 101.

The connection jig 112 includes, as illustrated in FIGS. 6 and 7, a cylindrical portion 122 and a protruding portion 124. The cylindrical portion 122 and the protruding portion 124 are integrally formed. The cylindrical portion 122 is a cylindrical member, and has a shape with an inner peripheral diameter that is larger than an outer peripheral diameter of the battery cell unit 60. The protruding portion 124 is arranged on an inner peripheral surface of the cylindrical portion 122, and has a ring shape protruding inward in a radial direction. That is, the protruding portion 124 is formed on an entire periphery of the cylindrical portion 122 in a circumferential direction. The protruding portion 124 is arranged in a vicinity of a center of the cylindrical portion 122 in the axis direction of the cylindrical portion 122. Further, in the connection jig 112, a boundary 126 between the cylindrical portion 122 and the protruding portion 124 has an R shape. That is, the boundary 126 between the cylindrical portion 122 and the protruding portion 124 is a curved surface.

The connection jig 112 is inserted into end portions of a side where the two battery cell units 60 are connected. That is, the connection jig 112 is a pipeline having a diameter larger than the battery cell unit 60, and having one end portion into which one battery cell unit 60 is inserted, and the other end portion into which the other battery cell unit 60 is inserted. Here, the battery cell unit 60 is inserted into an inside of the cylinder of the connection jig 112, and an outer peripheral surface is in contact with an inner peripheral surface of the connection jig 112 through the adhesive layer 114. Further, the end portion of the battery cell unit 60 in the axis direction is in contact with the protruding portion 124 of the connection jig 112 through the adhesive layer 114.

The adhesive layer 114 is formed between the connection jig 112 and the battery cell unit 60, to be specific, between the inner peripheral surface of the cylindrical portion 122 of the connection jig 112 and the protruding portion 124, and the inter connector 106 and the protection layer 118 of the battery cell unit 60. As the adhesive layer 114, a dense material with thermal expansion approximating to the solid electrolyte 104 is used. As the adhesive layer 114, a material in which fine alumina powder is added to coarse zirconia powder can be used. The adhesive layer 114 is formed, by being applied in a slurry state, and is then burned.

The connection portion cathode 115 is formed on an outer periphery of the connection jig 112 and outer peripheries of the two battery cell units 60. The connection portion cathode 115 is formed of a similar material to the cathode 105, and can be formed with the cathode 105 at the same time. The connection portion cathode 115 has one end portion be in contact with the inter connector 106 of one battery cell unit 60, and the other end portion be in contact with the inter connector 106 of the other battery cell unit 60, in the axis direction (the axis direction of the battery cell units 60 and the cylindrical portion 122). The connection portion cathode 115 has the both ends be in contact with the inter connectors 106 of the battery cell units 60, thereby to conduct the inter connectors 106 that are the end portions of the battery cell unit 60.

Here, an operation of the fuel battery module 12 made of the above configuration will be described. After performing a starting operation to increase the temperature of the fuel battery cells 100 to a predetermined temperature, the fuel battery module 12 performs a power generation operation to perform power generation in the fuel battery cells 100. When the fuel battery module 12 performs the power generation operation, the air flows in to the air supply chamber 88 of the fuel battery module 12. The air passes through a gap between the hole 51b of the heat insulating body 50 and the cell stack 56, and is supplied to the power generation chamber 82. Meanwhile, the fuel gas flows in to the fuel supply chamber 84. The fuel gas passes through an inside of the substrate tube 101 of the cell stack 56 and is supplied to the power generation chamber 82. At this time, the air and the fuel gas flow in mutually opposite directions in the inner peripheral surface and the outer peripheral surface of the cell stack 56.

The fuel gas flowing inside the substrate tube 101 passes through a fine hole of the substrate tube 101 and reaches the anode 103. The fuel gas is subjected to steam reformation with the active metal contained in the anode 103. Hydrogen generated by the steam reformation passes through a fine hole of the anode 103 and reaches the solid electrolyte 104. Meanwhile, the air flows outside the substrate tube 101 (cathode 105). Oxygen in the air is ionized in the middle of passage through a fine hole of the cathode 105 or reaches the solid electrolyte 104 and is ionized. The ionized oxygen passes through the solid electrolyte 104, and reaches the anode 103. Oxygen ions that have passed through the solid electrolyte 104 react with the fuel gas. The fuel battery module 12 performs the power generation with a potential difference caused by such a battery reaction.

Here, the cell stack 56 has the fuel battery cells 100 connected with the inter connector 106, so that the batteries are connected in series, as illustrated in FIG. 4. Further, the battery cell units 60 are connected with the connection portion cathode 115 of the connection mechanism 62, as illustrated by the arrow 132. Accordingly, one cell stack 56 has a structure in which the plurality of battery cell units 60 is connected with the connection mechanism 62, and the battery cells 100 are connected in series.

Then, the fuel gas that has been used in the power generation and has become a high temperature in the power generation chamber 82 is subjected to heat exchange with the air before being used in the power generation in the air supply chamber 88. Further, the air that has been used in the power generation and has become a high temperature in the power generation chamber 82 is subjected to heat exchange with the fuel gas before being used in the power generation in the air discharge chamber 89.

Following that, after the fuel gas and the air, which have been used in the power generation, are cooled by the heat exchange, the fuel gas flows in to the fuel discharge chamber 86, and is discharged from the fuel discharge chamber 86 to an outside of the fuel battery module 12, and the air is discharged from the air discharge chamber 89 to an outside of the fuel battery module 12.

The fuel battery module 12 can have one battery cell unit 60 made short by use of the cell stack 56 in which the plurality of battery cell units 60 is connected with the connection mechanism 62. Accordingly, the cell stack 56 arranged from one end to one end of the vessel 40 in the Z axis direction can be easily manufactured, and the fuel battery module 12 can be easily manufactured.

The cell stack 56 has the two battery cell units 60 connected with the connection jig 112 that includes the cylindrical portion 122 and the protruding portion 124 formed on the surface of the cylindrical portion 122 and having a protruding shape in the radial direction and the adhesive layer 114, thereby to allow the cylindrical portion 122 and the cylindrical portions of the battery cell units 60 to face each other, and to allow the protruding portion 124 and the end portions of the battery cell units 60 to come in contact with each other. The cell stack 56 can maintain the positions of the battery cell units 60 with respect to the connection jig 112 by allowing the battery cell units 60 and the protruding portion 124 to be in contact with each other. Further, the cylindrical portion 122 can support the end portions of the battery cell units 60, and the connection jig 112 can receive a load applied to the cell stack 56, so that concentration of the load to the battery cell units 60 can be suppressed. Further, the connection mechanism 62 can have a large adhesive surface and can increase adhesive strength by having the structure in which both of the cylindrical portion 122 and the protruding portion 124 are glued with the battery cell units 60 through the adhesive layers 114.

Further, the cell stack 56 is provided with the connection mechanism 62, so that a path of the fuel gas leaking to the cathode side between the battery cell units 60 becomes a path that passes between the protruding portion 124 of the connection jig 112 and the protection layer 118, and between the cylindrical portion 122 of the connection jig 112 and the protection layer 118, as illustrated by the arrow 140. That is, the path is surrounded by a long and dense layer with the cylindrical portion 122, and is filled with the dense adhesive layer 114. Accordingly, leakage of the fuel gas can be more reliably suppressed.

Further, the cell stack 56 has the cylindrical portion 122 of the connection mechanism 62 arranged at the outer peripheral sides of the battery cell units 60, thereby to make the strength of the cell stack 56 around the connection mechanism 62 higher.

Further, the cell stack 56 is provided with the protection layer 118 that serves as a dense layer, thereby to make the path through which the fuel gas leaks (gas leak path) longer, and can further decrease the leakage of the gas.

Here, the connection jig 112 favorably satisfies a relationship between a distance d and a thickness w of $3 \le d/w \le 9$, where the distance from the end portion of the cylindrical portion 122 to the protruding portion 124 in the axis direction is d, and the thickness of the substrate tube 101 is w. The distance d is caused to be three times the thickness w or more, so that the cylindrical portion 122 can favorably support the battery cell units 60 and can make the gas leak path long. Further, the distance d is caused to be nine times the thickness w or less, so that an area of non-power generation portion can be made small.

Further, the connection jig 112 favorably satisfies $6 \le d1/d2 \le 18$, where the length of the cylindrical portion 122 (the length from the end portion to the end portion) in the axis direction is d1, and the length of the protruding portion 124 is d2.

Further, the connection jig 112 favorably satisfies $0.5 \text{ mm} \le x \le 5 \text{ mm}$, where the thickness of the adhesive layer 114 is x. Note that the thickness of the adhesive layer 114 is the gap between the connection jig 112 and the cell unit 60. The thickness of the adhesive layer 114 is caused to be from 0.5 µm to 5 mm, both inclusive, so that the amount of the adhesive to be filled between the connection jig 112 and the unit 60 can be appropriately set and favorably connection can be realized.

Further, the protruding portion 124 may protrude to a more center side in the radial direction than the battery cell unit 60, or may protrude to a more outside in the radial direction than the inner peripheral surface of the battery cell unit 60 Further, the protruding portion 124 is provided in the entire periphery in the circumferential direction like the present embodiment, thereby to suppress the leakage of the fuel gas between the battery cell units 60 while supporting the battery cell units 60. Therefore, the protruding portion 124 is favorably provided in the entire periphery in the circumferential direction. However, the protruding portion may be provided in a part in the circumferential direction.

Here, the connection jig 112 has a dense property, and three-point bending strength is favorably from 100 MPa to 1000 MPa, both inclusive. The strength of the connection jig 112 is from 100 MPa to 1000 MPa, both inclusive, thereby to maintain high strength of the cell stack 56, and especially maintain high strength in the vicinity of the connection mechanism 62. Further, the density of the connection jig 112 is favorably from 5 g/cm$^3$ to 7 g/cm$^3$, both inclusive.

Further, in the fuel battery system 10 and the fuel battery module 12, the cell stack 56 is arranged from the end portion to the end portion of the vessel 40 in a direction along the Z axis direction (first direction). To be specific, in the fuel battery system 10 and the fuel battery module 12, the two pipe support plates 44 and 46 are arranged in the vessel 40 in the Z axis direction, and support the respective end portions of the cell stack 56. Here, the pipe support plate 44 is arranged in one end portion of the vessel 40, to be specific, in the vicinity of the connection portion between the cylindrical portion and the upper hemisphere. The pipe support plate 46 is arranged in the other end portion of the vessel 40, to be specific, in the vicinity of the connection portion between the cylindrical portion and the lower hemisphere. That is, one cell aggregate 42 is arranged in the Z axis direction of the vessel 40. Accordingly, in the Z axis direction, the power generation chamber 82, the fuel supply chamber 84, the fuel discharge chamber 86, the air supply chamber 88, and the air discharge chamber 89 can be made to be one. Further, the aforementioned chambers can be made to one cartridge in the Z axis direction, and it is not necessary to connect cartridges in the Z axis direction. Accordingly, arrangement efficiency of wiring in the vessel 40 can be improved, and arrangement density of the cell stacks 56 can be increased. Accordingly, power generation efficiency per unit volume can be increased. As described above, when the cell stacks 56 are arranged in the longitudinal direction of the vessel 40, the structure in which the plurality of battery cell units 60 is connected with the connection mechanism 62 is employed like the present embodiment, whereby one battery cell unit 60 can be made short and manufacturing becomes simple.

Next, an example of a method of manufacturing a cell stack will be described using FIG. 8. FIG. 8 is a flowchart illustrating an example of a method of manufacturing a cell stack. Note that, in FIG. 8, the number of the cell stacks to be manufactured is not limited. However, in the method of manufacturing a cell stack, two or more battery cell units 60 are manufactured, and one or more connection jigs are manufactured.

First, in the method of manufacturing a cell stack, the substrate tube 101 is manufactured (step 312). The substrate tube 101 is formed into a tube shape by an extrusion molding method, and is dried.

In the method of manufacturing a cell stack, after the substrate tube 101 is manufactured, anode slurry is applied on the surface of the substrate tube 101 (step S14). For example, the anode slurry is applied to portions that are to become the anode and the lead portion by a screen printing method. Note that, as a method of applying slurry, there are a method of applying slurry using a jet dispenser, and a method of applying slurry with a blush or the like, other than the screen printing method. The same applies to application of slurry described below. The anode slurry is prepared such that a vehicle such as squeegee oil is added to mixed powder of NiO and yttria stabilized zirconia (YSZ), and the powder is mixed by three rollers. In at least one end portion side of the substrate tube 101, it is good to print the anode slurry by shifting the end portion of the substrate tube 101 to an inside to expose the end portion.

In the method of manufacturing a cell stack, after the anode slurry is applied to the surface of the substrate tube 101, electrolyte (solid electrolyte) slurry is applied (step S16). The solid electrolyte slurry is prepared such that a vehicle like squeegee oil is added to YSE powder, and the powder is mixed by the three rollers. It is also good to print the solid electrolyte slurry by shifting the end portion to an inside to expose the anode slurry in at least the one end portion side of the substrate tube 101.

In the method of manufacturing a cell stack, after the electrolyte (solid electrolyte) slurry is applied, inter connector slurry is applied (step S17). Further, in the method of manufacturing a cell stack, the inter connector slurry is applied to a portion corresponding to the protection layer 118, in addition to a portion corresponding to the inter connector 106. The inter connector slurry is prepared such that a vehicle such as squeegee oil is added to lantern-doped strontium titanate (Sr1−xLaxTiO3) powder, and the powder is mixed by the three rollers.

In the method of manufacturing a cell stack, after the anode slurry, the electrolyte slurry, and the inter connector slurry are applied to the surface of the substrate tube 101, the substrate tube 101 is fired (step S18). The firing is performed in a state where the substrate tube 101 on which the slurry is printed is hung. When hanging the substrate tube 101, the substrate tube 101 having a shorter length is arranged in a lower side in a gravity direction. The firing is performed under condition of 1400° C. for 5 hours, using an electric furnace, for example.

In the method of manufacturing a cell stack, after the substrate tube on which the anode slurry, the electrolyte slurry, and the inter connector slurry are applied is fired, and a stacked body in which the anode, the solid electrolyte, the inter connector, and the protection layer are formed on the surface of the substrate tube 101 is formed, an adhesive is applied to an adhesive surface of the stacked body or an adhesive surface of a connection member, or both adhesive surfaces (step S20). The adhesive is a material that is to serve as the adhesive layer 114. The adhesive can be applied to the adhesive surface by attaching an end portion of the stacked body to a vessel in which the adhesive is stored, or applying the adhesive on the stacked body with a blush or the like. Here, the adhesive is applied to a surface of an end portion of an outer periphery side and an end surface, of the stacked body. A cover may be provided to a portion where no adhesive is applied.

In the method of manufacturing a cell stack, after the adhesive is applied to the surface of the stacked body, the stacked body is connected to the connection jig (step S22). The connection jig is manufactured in advance. In the method of manufacturing a cell stack, the end portion of the stacked body is inserted into an inner periphery of the connection jig manufactured in advance. In the method of manufacturing a cell stack, the end portions of two stacked bodies are inserted into two connection jigs. In the method of manufacturing a cell stack, after the stacked body is inserted, the adhesive may be further applied between the connection jigs and the stacked bodies.

In the method of manufacturing a cell stack, after the two stacked bodies are connected to the connection jigs, cathode slurry is applied (step S26). In the method of manufacturing a cell stack, the cathode slurry is applied to a portion where the cathode is formed, and a portion where the connection portion cathode is formed. The cathode slurry is prepared such that a vehicle such as squeegee oil is added to LaSrMnO$_3$ powder, for example, and the powder is mixed by the three rollers.

In the method of manufacturing a cell stack, after the cathode slurry is applied, the product is hung and fired (step S28). The firing is performed under condition of 1400° C. for 5 hours, using an electric furnace, for example.

In the method of manufacturing a cell stack, the cell stack 56 in which the battery cell units 60 are connected with the connection mechanism 62 is manufactured as described above. In the method of manufacturing a cell stack, by use of the connection jig 112, deviation of the positions of the battery cell units 60 with respect to the connection mechanism 62 can be suppressed at the time of manufacturing. Further, the applied adhesive can be favorably held between the battery cell units 60 and the connection jig 112. Accordingly, the cell stack 56 in which the battery cell units 60 are connected with the connection mechanism 62 can be easily manufactured with high accuracy. That is, the cell stack having an insufficient length in the axis direction can be easily manufactured with high accuracy.

FIG. 9 is a sectional view schematically illustrating a part of a cell stack of another example. Here, in the above embodiment, the connection portion cathode 115 has been used as wiring that connects two battery cell units 60. However, an embodiment is not limited thereto, and the connection portion cathode 115 may be used as a part of a power generation cell.

A cell stack 56a illustrated in FIG. 9 includes a plurality of battery cell units 60a and one or more connection mechanisms 62a. The connection mechanism 62a has a similar structure to the connection mechanism 62. One battery cell unit 60a (the battery cell unit 60a on the right side in FIG. 9) of the two battery cell units 60a is formed up to a position where an inter connector 106 comes in contact with a connection cathode 115 of the connection mechanism 62a, similarly to the battery cell unit 60. The other battery cell unit 60a (the battery cell unit 60a on the left side in FIG. 9) of the two battery cell units 60a is formed up to a position where an anode 103 and an electrolyte 104 come in contact with the connection cathode 115 of the connection mechanism 62a.

As described above, the connection portion cathode 115 of the cell stack 56a is in contact with a solid electrolyte 104 of the one battery cell unit 60a, and is in contact with the inter connector 106 of the other battery cell unit 60a. Accordingly, a connection state of the battery cell unit 60a and the connection portion cathode 115 that are in contact with the solid electrolyte 104 becomes a state in which the fuel electrode 103, the solid electrolyte 104, and the connection portion cathode are stacked, and serves as a power generation cell.

As described above, the cell stack 56a can perform power generation at a position where the connection portion cathode 115 is included, with the structure in which the connection portion cathode 115 is in contact with the solid electrolyte 104 of the one battery cell unit 60a, and is in contact with the inter connector 106 of the other battery cell unit 60a. As described above, the power generation is performed even in the connection portion cathode 115, so that a power generation area of the cell stack 56a can be made larger. Further, the cell stack 56a can maintain a dense state by having the fuel electrode 103 of the one battery cell unit 60a formed up to the end portion of the substrate tube 101 at the connection jig 112 side, and can decrease leakage of the fuel gas even when the solid electrolyte 104 is arranged up to the end portion of the substrate tube 101.

Next, another example of a cell stack will be described using FIGS. 10 to 13. In the above embodiment, the structure in which the cylindrical portion 122 of the connection jig is arranged at the outer periphery side of the battery cell unit 60 has been employed. However, an embodiment is not limited to the structure. A cell stack may have a structure in which a cylindrical portion of a connection jig is arranged at an inner periphery side of a battery cell unit 60.

Figure 10:
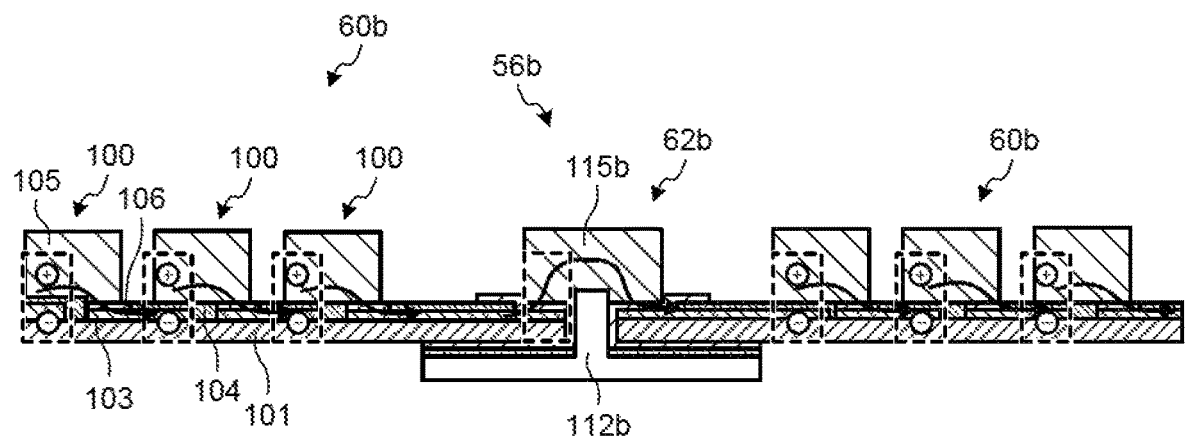
FIG. 10 is a sectional view schematically illustrating a part of a cell stack of another example.
Figure 11:
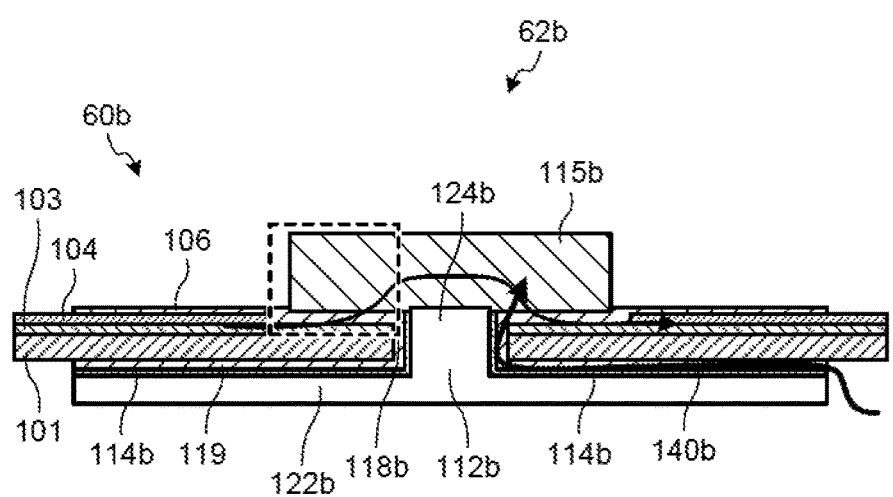
FIG. 11 is an enlarged sectional view illustrating an enlarged vicinity of a connection mechanism.
Figure 12:
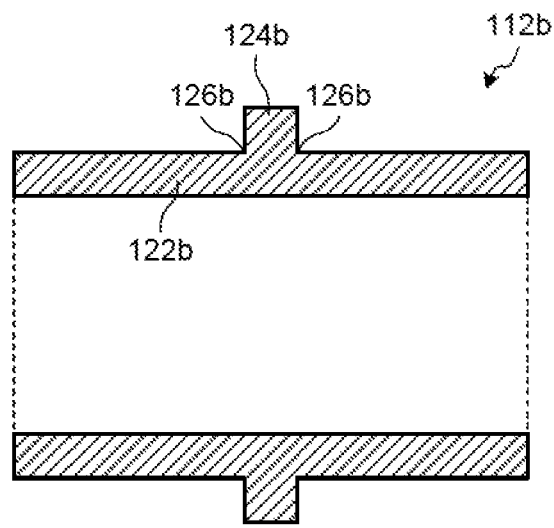
FIG. 12 is a sectional view of a connection jig.
Figure 13:
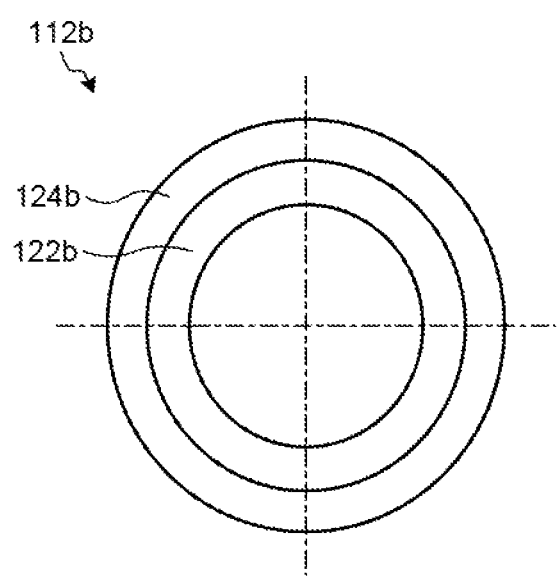
FIG. 13 is a top view of the connection jig.

FIG. 10 is a sectional view schematically illustrating a part of a cell stack of another example. FIG. 11 is an enlarged sectional view illustrating an enlarged vicinity of a connection mechanism. FIG. 12 is a sectional view of a connection jig. FIG. 13 is a top view of the connection jig.

A cell stack 56b illustrated in FIG. 10 includes a plurality of battery cell units 60b and one or more connection mechanisms 62b. The battery cell unit 60b includes a cylindrical substrate tube 101 and a fuel battery cell 100 provided on an outer peripheral surface of the substrate tube 101 and serving as a power generation element. The battery cell unit 60b has a similar structure to the battery cell unit 60, other than a structure of an end portion of a connection mechanism 62b side.

Further, a protection film 118b and a protection layer 119 are formed on an end portion of the battery cell unit 60b of the present embodiment where the connection mechanism 62 is installed. The protection film 118b is formed on an end portion in an axis direction of a surface (outer peripheral surface) of the substrate tube 101 at an outside in a radial direction, an end surface of the substrate tube 101, and an end surface of the adjacent battery cell unit 60 side. The protection film 118b of the present embodiment is formed of the same material as an inter connector (a dense film having an electrical conduction property). A portion of the surface of the substrate tube 101 of the protection film 118b is integrally formed with an inter connector (a dense film having an electrical conduction property) 106. A portion of the end surface of the protection film 118b is formed by application of a material used for the inter connector. The protection layer 119 is formed on an end portion in the axis direction of a surface (inner peripheral surface) of the substrate tube 101 at an inside in the radial direction. The protection film 119 is favorably formed in the same length as a cylindrical portion 122b of a connection jig 112b in the axis direction. The protection film 119 is formed by application of a material used for inter connector.

Next, the connection mechanism 62b includes, as illustrated in FIG. 11, the connection jig 112b, an adhesive layer 114b, and a connection portion cathode 115b. The connection jig 112b is arranged between two battery cell units 60b to be connected, and is glued with the two battery cell units 60 with the adhesive layer 114b. The connection jig 112b is favorably manufactured of a similar material to the connection jig 112.

The connection jig 112b includes, as illustrated in FIGS. 12 and 13, a cylindrical portion 122b and a protruding portion 124b. The cylindrical portion 122b and the protruding portion 124b are integrally formed. The cylindrical portion 122b is a cylindrical member, and has an outer peripheral diameter smaller than an inner-peripheral diameter of the battery cell unit 60b. The protruding portion 124b is arranged on an outer peripheral surface of the cylindrical portion 122b, and has a ring shape protruding outward in the radial direction. That is, the protruding portion 124b is formed on an entire periphery of the cylindrical portion 122b in a circumferential direction. The protruding portion 124b is arranged in a vicinity of a center of the cylindrical portion 122b in an axis direction of the cylindrical portion 122b. Further, in the connection jig 112b, a boundary 126b between the cylindrical portion 122b and the protruding portion 124b has an R shape.

The connection jig 112b is inserted into end portions of a side where the two connected battery cell units 60b are connected. That is, the connection jig 112b is a pipeline having a diameter smaller than the battery cell unit 60b, and having one end portion inserted into one battery cell unit 60b and the other end portion inserted into the other battery cell unit 60. Here, the battery cell unit 60b is inserted into an outside of the cylinder of the connection jig 112b, and an inner peripheral surface is in contact with an outer peripheral surface of the connection jig 112b through the adhesive layer 114b. Further, an end portion of the battery cell unit 60b in the axis direction is in contact with the protruding portion 124b of the connection axis 112b through the adhesive layer 114b.

The adhesive layer 114b is formed between the connection jig 112b and the battery cell unit 60b, to be specific, between the outer peripheral surface of the cylindrical portion 122b and the protruding portion 124 of the connection jig 112b, and the protection layers 118b and 119 of the battery cell unit 60. As the adhesive layer 114b, a dense material with thermal expansion approximating to a solid electrolyte 104 is used. As the adhesive layer 114b, a material in which fine alumina powder is added to coarse zirconia powder can be used. The adhesive layer 114b is applied in a slurry state, and is then burned, thereby to be formed.

The connection portion cathode 115b is formed on an outer periphery of the connection jig 112b and outer-peripheries of the two battery cell units 60b. The connection portion cathode 115b is formed of a similar material to the cathode 105, and can be formed with the cathode 105 at the same time. The connection portion cathode 115b has one end portion be in contact with an inter connector 106 of the one battery cell unit 60b, and the other end portion be in contact with an inter connector 106 of the other battery cell unit 60b, in the axis direction (the axial direction of the battery cell unit 60b and the cylindrical portion 122b). The connection portion cathode 115b has the both ends be in contact with the inter connectors 106 of the battery cell units 60b, thereby to conduct the inter connectors 106 that are end portions of the battery cell units 60b.

As described above, the cell stack 56b may have the diameter of the cylindrical portion 122b of the connection jig 112b of the connection mechanism 62b made smaller than the diameter of the battery cell unit 60b, and have a shape in which the outer peripheral surface of the cylindrical portion 122 faces the outer peripheral surfaces of the battery cell units 60b. Even in this case, the cell stack 56b is provided with the cylindrical portion 122b and the protruding portion 124b, thereby to suppress the deviation of the positions of the battery cell units 60b with respect to the connection jig 112b, and to favorably support the battery cell units 60b with the connection jig 112b.

Further, the cell stack 56b has the cylindrical portion 122b arranged at an inner side than the battery cell unit 60b in the radial direction, thereby to have only the protruding portion 124b, as a portion exposed from the battery cell unit 60b to the cathode side. Accordingly, an area coated with the connection portion cathode 115b can be made small, and a portion in a power generation portion of the cell stack 56b, not contributing to power generation, can be made small.

Further, the cell stack 56b is provided with the protection layers 118b and 119, so that a path of a fuel gas leaking to the cathode side between the battery cell units 60 becomes a path of passing between the protruding portion 124b of the connection jig 112 and the protection layer 118b of between the cylindrical portion 122b of the connection jig 112b and the protection layer 118b, and, as illustrated by the arrow 140b. That is, the path is surrounded by a long and dense layer with the cylindrical portion 122, and is filled with the dense adhesive layer 114b. Accordingly, the leakage of the fuel gas can be more reliably suppressed.

The cell stack 56b can be manufactured by a similar work procedure to the above-described cell stack 56.

It is favorable for the connection jig 112b to have a relationship between a distance d and a thickness w, a relationship between a length d1 of the cylindrical portion 122b (length from end portion to end portion) and a length d2 of the protruding portion 124b, and a thickness x of the adhesive layer, which are similar to the connection axis 112.

Figure 14:
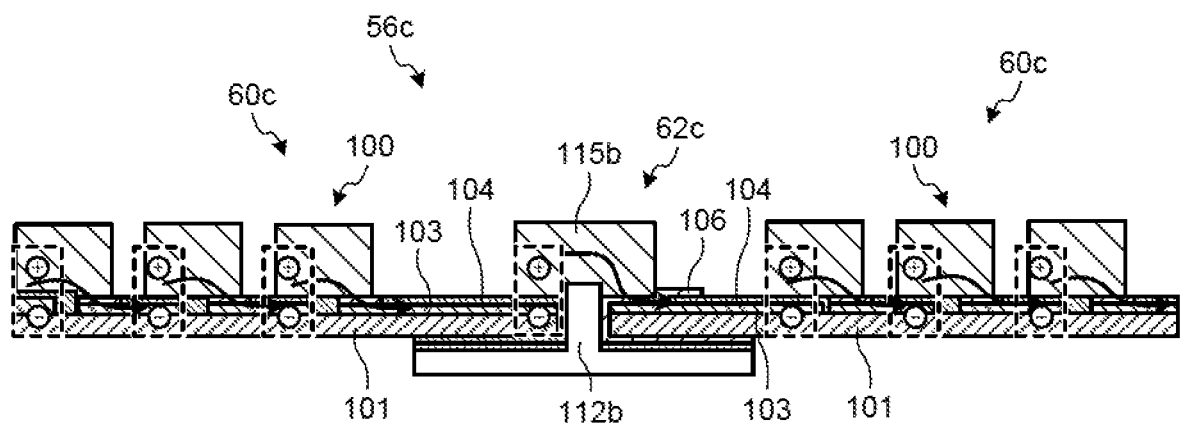
FIG. 14 is a sectional view schematically illustrating a part of a cell stack of another example.

FIG. 14 is a sectional view schematically illustrating a part of a cell stack of another example. In the above embodiment, the connection portion cathode 115b has been used as wiring that connects the two battery cell units 60b. However, an embodiment is not limited thereto, and the connection portion cathode 115b may be used as a part of a power generation cell.

A cell stack 56c illustrated in FIG. 14 includes a plurality of battery cell units 60c and one or more connection mechanisms 62c. The connection mechanism 62c has a similar configuration to the connection mechanism 62b. One battery cell unit 60c (the battery cell unit 60c on the right side in FIG. 14) of the two battery cell units 60c is formed up to a position where an inter connector 106 comes in contact with a connection cathode 115b of the connection mechanism 62c, similarly to the battery cell unit 60b. The other battery cell unit 60c (the battery cell unit 60c on the left side in FIG. 14) of the two battery cell units 60c is formed up to a position where an anode 103 and a solid electrolyte 104 come in contact with a connection cathode 115b of the connection mechanism 62c. The fuel electrode 103 and the electrolyte 104 are arranged between a substrate tube 101 and a cylindrical portion 122b of a connection jig 112b, similarly to a protection layer 119 of the connection mechanism 62b.

As described above, a connection portion cathode 115b of the cell stack 56c is in contact with a solid electrolyte 104 of the one battery cell unit 60c, and is in contact with the inter connector 106 of the other battery cell unit 60c. Accordingly, a connection state of the battery cell units 60c being in contact with the solid electrolyte 104 and the connection portion cathode 115b becomes a state in which the fuel electrode 103, the solid electrolyte 104, and the connection portion cathode 115 are stacked, and serves as a power generation cell.

As described above, the cell stack 56c has a structure in which the connection portion cathode 115b is in contact with the solid electrolyte 104 of the one battery cell unit 60c, and is in contact with the inter connector 106 of the other battery cell unit 60c, thereby to perform power generation at a position where the connection portion cathode 115b is included. As described above, the power generation is performed even in the connection portion cathode 115b, so that a power generation area of the cell stack 56c can be made larger. Further, the cell stack 56c has the fuel electrode 103 of the one battery cell unit 60c formed in an area sandwiched by the substrate tube 101 and the connection jig 112b, that is, formed up to an inner peripheral surface of the substrate tube 101, thereby to maintain a dense state and to decrease leakage of a fuel gas even when the solid electrolyte 104 is arranged up to an end portion of the substrate tube 101.

REFERENCE SIGNS LIST

10 FUEL BATTERY SYSTEM
12 FUEL BATTERY MODULE
14 AIR SUPPLY DEVICE
15 AIR DISCHARGE PIPE
16 FUEL SUPPLY DEVICE
17 FUEL DISCHARGE PIPE
18 CONTROL DEVICE
19 VOLTMETER
20 AMMETER
21 THERMOMETER
22 AIR SUPPLY SOURCE
24 AIR SUPPLY PIPING
26 FUEL SUPPLY SOURCE
28 FUEL SUPPLY PIPING
40 VESSEL
42 CELL AGGREGATE
44 and 46 PIPE SUPPORT PLATE
48 and 50 HEAT INSULATING BODY
52 CIRCUMFERENTIAL-DIRECTION HEAT INSULATING BODY
56 CELL STACK
60 BATTERY CELL UNIT
62 CONNECTION MECHANISM
66 AIR INFLOW PIPE
68 AIR DISCHARGE PIPE
70 FUEL GAS INFLOW PIPE
72 FUEL GAS DISCHARGE PIPE
82 POWER GENERATION CHAMBER
84 FUEL SUPPLY CHAMBER
86 FUEL DISCHARGE CHAMBER
88 AIR SUPPLY CHAMBER
89 AIR DISCHARGE CHAMBER
90 POWER GENERATION PORTION
92 and 94 LEAD PORTION
100 FUEL BATTERY CELL
101 SUBSTRATE TUBE
103 FUEL ELECTRODE (FUEL ELECTRODE)
104 SOLID ELECTROLYTE
105 CATHODE (AIR ELECTRODE)
106 INTER CONNECTOR
112 CONNECTION JIG
114 ADHESIVE LAYER
115 CONNECTION PORTION CATHODE
118 PROTECTION LAYER
122 CYLINDRICAL PORTION
124 PROTRUDING PORTION
126 BOUNDARY
132 and 140 ARROW

The invention claimed is:

1. A cell stack comprising:
a plurality of battery cell units comprising a first battery cell unit and a second battery cell unit adjacent to the first battery cell unit, each of the battery cell units comprising:
a plurality of battery cells formed in an axis direction of a cylindrical substrate tube and disposed on a surface of the cylindrical substrate tube, each of the plurality of battery cells comprising an anode, an electrolyte, and a cathode, each of the plurality of battery cells being connected by an inter connector; and
a connection mechanism that connects an end portion of the cylindrical substrate tube of the first battery cell unit to an end portion of the cylindrical substrate tube of the second battery cell unit in the axis direction, wherein
the connection mechanism includes a connection jig including:
a cylindrical portion facing a circumferential surface of the cylindrical substrate tube of the first battery cell unit and a circumferential surface of the cylindrical substrate tube of the second battery cell unit, and
a protruding portion protruding from the cylindrical portion and having a protruding shape in a radial direction of the cylindrical portion, the protruding portion being disposed between an end surface of the cylindrical substrate tube of the first battery cell unit in the axis direction and an end surface of the cylindrical substrate tube of the second battery cell unit in the axis direction, and
an adhesive layer applied between the cylindrical portion of the connection jig and each of the battery cell units to join the connection jig and the first and second battery cell units,
wherein the cylindrical portion and the protruding portion are integrally formed in advance such that the connection jig is a one-piece member, and
the cylindrical portion and the protruding portion are not fuel gas permeable so as to prevent fuel gas leakage therethrough.

2. The cell stack according to claim 1, wherein,
in the connection jig, a relationship between a distance d from an end portion of the cylindrical portion to the protruding portion, and a thickness w of the substrate tube of the first battery cell unit is $3 \leq d/w \leq 9$ in the axis direction.

3. The cell stack according to claim 1, further comprising:
a connection portion cathode that coats an entire surface of an end portion of the connection jig at an outside in the radial direction, and electrically connects the first and second battery cell units arranged across the connection jig.

4. The cell stack according to claim 3, wherein
the connection portion cathode is in contact with the electrolyte of the first battery cell unit disposed at one end of the first battery cell unit in the axis direction, and is in contact with the inter connector of the second battery cell unit disposed at one end of the second battery cell unit in the axis direction, the one end of the second battery cell unit facing the one end of the first battery cell unit.

5. The cell stack according to claim 1, wherein,
in each of the battery cell units, a layer of a same material as the inter connector is formed on the end surface of the cylindrical substrate tube in the axis direction.

6. The cell stack according to claim 1, wherein,
in the connection jig, the cylindrical portion is arranged at an outer side of the cylindrical substrate tube of the first battery cell unit and at an outer side of the cylindrical substrate tube of the second battery cell unit.

7. The cell stack according to claim 1, wherein, in the connection jig, the cylindrical portion is arranged at an inner side of the cylindrical substrate tube of the first battery cell unit and at an inner side of the cylindrical substrate tube of the second battery cell unit.

8. The cell stack according to claim 7, wherein, in each of the battery cell units, a layer of a same material as the inter connector is formed between the cylindrical substrate tube and the cylindrical portion.

9. A fuel battery module comprising:
a cell aggregate in which a plurality of cell stacks according to claim 1 are arranged in parallel;
a vessel that houses the cell aggregate;
a fuel supply main device configured to supply a fuel gas to an inside of the battery cell units of the cell stacks; and
an oxidant supply main device configured to supply an oxidant to an outside of the cell stacks.

10. The cell stack according to claim 2, further comprising:
a connection portion cathode that coats an entire surface of an end portion of the connection jig at an outside in the radial direction, and electrically connects the first and second battery cell units arranged across the connection jig.

11. The cell stack according to claim 2, wherein, in each of the battery cell units, a layer of a same material as the inter connector is formed on the end surface of the substrate tube in the axis direction.

12. The cell stack according to claim 3, wherein, in each of the battery cell units, a layer of a same material as the inter connector is formed on the end surface of the substrate tube in the axis direction.

13. The cell stack according to claim 4, wherein, in each of the battery cell units, a layer of a same material as the inter connector is formed on the end surface of the substrate tube in the axis direction.

14. The cell stack according to claim 2, wherein, in the connection jig, the cylindrical portion is arranged at an outer side of the cylindrical substrate tube of the first battery cell unit and at an outer side of the cylindrical substrate tube of the second battery cell unit.

15. The cell stack according to claim 3, wherein, in the connection jig, the cylindrical portion is arranged at an outer side of the cylindrical substrate tube of the first battery cell unit and at an outer side of the cylindrical substrate tube of the second battery cell unit.

16. The cell stack according to claim 4, wherein, in the connection jig, the cylindrical portion is arranged at an outer side of the cylindrical substrate tube of the first battery cell unit and at an outer side of the cylindrical substrate tube of the second battery cell unit.

17. The cell stack according to claim 5, wherein, in the connection jig, the cylindrical portion is arranged at an outer side of the cylindrical substrate tube of the first battery cell unit and at an outer side of the cylindrical substrate tube of the second battery cell unit.

18. The cell stack according to claim 2, wherein, in the connection jig, the cylindrical portion is arranged at an inner side of the cylindrical substrate tube of the first battery cell unit and at an inner side of the cylindrical substrate tube of the second battery cell unit.

19. The cell stack according to claim 3, wherein, in the connection jig, the cylindrical portion is arranged at an inner side of the cylindrical substrate tube of the first battery cell unit and at an inner side of the cylindrical substrate tube of the second battery cell unit.

20. The cell stack according to claim 1, wherein the adhesive layer is applied between the protruding portion and the end surface of the cylindrical substrate tube of the first battery cell unit, and wherein the adhesive layer is applied between the protruding portion and the end surface of the cylindrical substrate tube of the second battery cell unit.

21. The cell stack according to claim 1, wherein the protruding portion protrudes inward in the radial direction of the cylindrical portion such that the cylindrical portion and the protruding portion form a T-shape in a cross section.

* * * * *